United States Patent
Koide

[11] Patent Number: 5,102,982
[45] Date of Patent: Apr. 7, 1992

[54] AROMATIC POLYAMIDE FROM 2,7-NAPHTHALENE DICARBOXYLIC ACID OR DERIVATIVE

[75] Inventor: Shunichi Koide, Tokyo, Japan

[73] Assignee: Showa Shell Sekiyu Kabushiki Kaisha, Tokyo, Japan

[21] Appl. No.: 591,057

[22] Filed: Oct. 1, 1990

[30] Foreign Application Priority Data

Jun. 1, 1990 [JP] Japan ................. 2-144027
Jun. 5, 1990 [JP] Japan ................. 2-147059

[51] Int. Cl.$^5$ ............................................. C08G 69/32
[52] U.S. Cl. ................... 528/344; 528/183; 528/190; 528/229; 528/337
[58] Field of Search ............... 528/344, 337, 229, 183, 528/190

[56] References Cited

U.S. PATENT DOCUMENTS

| | | | |
|---|---|---|---|
| 3,354,125 | 11/1967 | Smith et al. | 260/78 |
| 3,485,804 | 12/1969 | Kawabata et al. | 260/78 |
| 3,518,234 | 6/1970 | Hara et al. | 260/78 |
| 3,674,752 | 7/1972 | Ridgway et al. | 260/78 |
| 4,012,365 | 3/1977 | Moriyama et al. | 360/78 |
| 4,246,395 | 1/1981 | Mortimer | 528/208 |
| 4,640,973 | 2/1987 | Davis et al. | 528/208 |

FOREIGN PATENT DOCUMENTS

| | | |
|---|---|---|
| 1254347 | 11/1967 | Fed. Rep. of Germany . |
| 2449664 | 4/1975 | Fed. Rep. of Germany . |
| 2449713 | 5/1975 | Fed. Rep. of Germany . |
| 2438426 | 6/1975 | Fed. Rep. of Germany . |
| 2208811C2 | 5/1982 | Fed. Rep. of Germany . |
| 1526594 | 5/1968 | France . |
| 1577469 | 8/1969 | France . |
| 1129466 | 10/1968 | United Kingdom . |
| 1476692 | 6/1977 | United Kingdom . |

OTHER PUBLICATIONS

Abstract of U.S. Pat. No. 4,042,571, 8/77, Kawase.
Abstract of Japan 5045095, 4/75.

Primary Examiner—Harold D. Anderson
Attorney, Agent, or Firm—Cushman, Darby & Cushman

[57] ABSTRACT

Aromatic polyamides of the invention are polyamides comprising a recurring unit

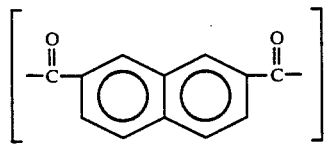

and a recurring unit [—NH—Ar$_1$—NH—] and copolyamides comprising a recurring unit

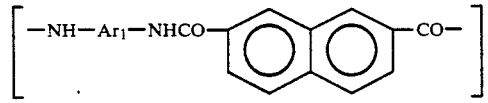

and a recurring unit [—NH—Ar$_2$—NHCO—Ar$_3$—CO—] wherein Ar$_1$ and Ar$_2$ are, for example, phenylene group, naphthylene group, biphenylene group, and 4,4'-methylenediphenylene group and Ar$_3$ is, for example, phenylene group, naphthylene group and biphenylene group in which both the bonding chains extend in the coaxial direction or in the parallel direction to axis.

The aromatic polyamide of the invention has high glass transition temperature and has heat resistance, high strength, and high elasticity and besides is soluble in various solvents and is excellent in spinnability and film-formability. The aromatic polyamide is molded into fibers or films and can be utilized as electric insulating materials, laminates, varnishes, fabrics, synthetic papers, etc.

6 Claims, No Drawings

AROMATIC POLYAMIDE FROM 2,7-NAPHTHALENE DICARBOXYLIC ACID OR DERIVATIVE

The present invention relates to a solvent-soluble aromatic polyamide and a process for producing it.

More particularly, it relates to a novel aromatic polyamide which is soluble in various solvents and has excellent processability, such as in spinning and film-forming, and has excellent properties such as high glass transition temperature, high heat resistance, high strength and high elasticity and a process for producing it.

The aromatic polyamide of the present invention is soluble in various organic solvents while retaining excellent properties such as high glass transition point, so it can be solution-molded and can be easily processed into fibers and films.

Therefore, the aromatic polyamide of the present invention can be utilized for various uses in the form of fibers, films, and solvent-soluble compositions such as industrial materials, electrical insulating materials, laminate constructions, varnish, adhesives, tire cords, resins, reinforcing materials for concrete, filter cloths, and synthetic papers.

Aromatic polyamides are known to have various excellent chemical and physical properties such as high melting point, high glass transition temperature, heat resistance and chemical resistance, and fibers comprising aromatic polyamide and having excellent heat resistance are useful as heat resistant fibers and fibers having excellent mechanical properties such as high initial Young's modulus and strength are useful as composite materials such as reinforcing materials for tire cords and plastics.

Above all, aromatic homopolyamides or copolyamides in which bonding chains extend in coaxial or parallel direction from respective aromatic rings such as poly(p-phenyleneterephthalamide) and poly(m-phenyleneisophthalamide) are known to provide fibers having high Young's modulus. However, while polyamides having such large stiffness and high symmetry generally have excellent mechanical properties, they are inferior in solubility in solvents and cannot be easily molded.

For example, poly(p-phenyleneterephthalamide) is limited in solvents which can dissolve it, namely, the solvents are limited to strong acids such as sulfuric acid or the solvent systems comprising mixed solvent of hexamethylphosphoramide and N-methyl-pyrrolidone or tetramethylurea to which inorganic salt such as lithium chloride is added. Moreover, when molding is carried out in industrial scale, strong acids such as sulfuric acid have problems in corrosion, danger in handling and disposal of waster liquor. Furthermore, dissolution in the organic mixed solvent above requires troublesome operations and thus it is not easy.

Furthermore, it is known to introduce m-phenylene moiety or a moiety of

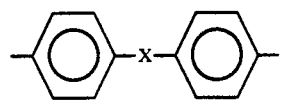

(X is —O—, —S—, —CH$_2$—, etc) into aromatic homopolyamides or copolyamides having stiffness and symmetry where bonding chains extend in a coaxial direction or in a direction parallel to the axis from aromatic rings to improve the solubility thereof. However, even if a m-phenylene moiety is introduced, the solubility of the resulting copolyamide can be improved to some extent, but the fibers obtained from such a copolyamide tend to suffer from a decrease in mechanical properties, especially initial Young's modulus with increase of proportion of m-phenylene moiety. Moreover, even if the moiety of

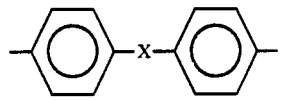

(X is —O—, —S—, —CH$_2$—, etc.) is introduced, the solubility of the resulting copolyamide can be improved to some extent, but mechanical properties, especially initial Young's modulus of fiber obtained therefrom also tend to much decrease with increase of proportion of the moiety

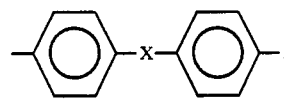

The aromatic polyamides of the present invention are those which comprise 2,7-dicarboxynaphthalene group and aromatic diamino group and in more detail, one of them is an aromatic polyamide, characterized by substantially comprising dicarboxylic acid recurring unit represented by the formula:

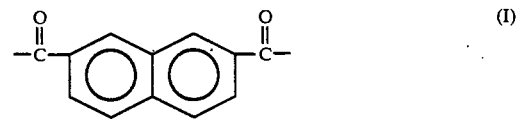

(I)

and diamine recurring unit represented by the formula:

—NH—Ar$_1$—NH—    (II)

(wherein Ar$_1$ represents a phenylene group, a naphthylene group or a group represented by the formula:

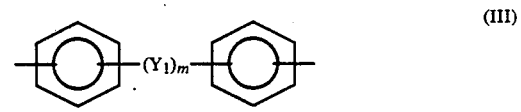

(III)

wherein Y$_1$ represents a lower alkylidene group, an oxygen atom, a sulfur atom, a carbonyl group or a sulfonyl group and m is 0 or 1).

This aromatic polyamide can be produced by reacting (a) a naphthalene-2,7-dicarboxylic acid or dihalide thereof with (b) an aromatic diamine represented by the formula: H$_2$N—Ar$_1$—NH$_2$ (wherein Ar$_1$ is the same as defined above).

Another one of the aromatic polyamides of the present invention is an aromatic copolyamide which comprises substantially 10–90 mol % of recurring unit represented by the formula (IV):

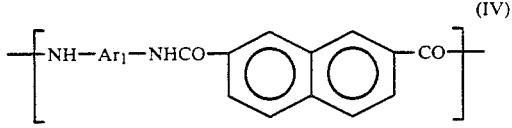

and 10-90 mol % of recurring unit represented by the formula (V):

$$-NH-Ar_2-NHCO-Ar_3-CO- \quad (V)$$

(wherein $Ar_1$ and $Ar_2$ each represents a phenylene group, a naphthylene group or a group represented by the formula:

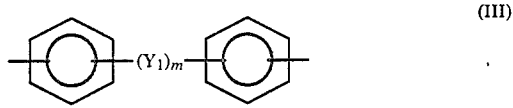

$Ar_3$ represents a phenylene group, a naphthylene group or a group represented by the formula:

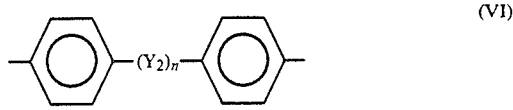

which have bonding chains extending in coaxial direction or in parallel direction to axis, wherein $Y_1$ and $Y_2$ each represents a direct linkage, a lower alkylidene group, an oxygen atom, a sulfur atom, a carbonyl group or a sulfonyl group and m and n each represents 0 or 1).

This aromatic copolyamide can be produced by reacting 10–90 mol % of (c) aromatic dicarboxylic acids represented by XOC—$Ar_3$—COX and (b) diamines represented by $H_2N$—$Ar_3$—$NH_2$ and $H_2N$—$Ar_2$—$NH_2$ with (a) 90–10 mol % of naphthalene-2,7-dicarboxylic acids or dihalides thereof (in these formulas, $Ar_1$, $Ar_2$ and $Ar_3$ are the same as defined above and X represents a hydroxyl group or a halogen atom).

The naphthalene-2,7-dicarboxylic acid dihalide of the component (a) includes the dichloride, difluoride, and dibromide.

As diamines of component (b) represented by $H_2N$—$Ar_1$—$NH_2$ and $H_2N$—$Ar_2$—$NH_2$, mention may be made of m-phenylenediamine, p-phenylenediamine, 4,4'-diaminobiphenyl, 3,3'-methylenedianiline, 4,4'-methylenedianiline, 4,4'-ethylenedianiline, 4,4'-isopropylidenedianiline, 3,4'-oxydianiline, 4,4'-oxydianiline, 4,4'-thiodianiline, 3,3'-carbonyldianiline, 4,4'-carbonyldianiline, 3,3'-sulfonyldianiline, 4,4'-sulfonyldianiline, 1,4-naphthalenediamine, 1,5-naphthalenediamine, 2,6-naphthalenediamine, and 2,7-naphthalenediamine. These may be used singly or in admixture.

Examples of aromatic dicarboxylic acids represented by the formula (c): XOC—$Ar_3$—COX are those in which $Ar_3$ is 1,4-phenylene, 2,6-naphthylene or 4,4-biphenylene and X is OH, Cl, F or Br.

The aromatic polyamides of the present invention have preferably 10 or more in degree of polymerization. When the degree of polymerization above is more than 200, the polyamides gradually tend to lower in solubility in solvents.

Reaction, of naphthalene dicarboxylic acids or dihalides thereof with aromatic diamines can be performed by known polycondensation processes such as melt polycondensation, solid phase polycondensation, interfacial polycondensation, and solution polycondensation.

In the process of the present invention, when a halide is used as component (a) or component (c), it is preferred to carry out reaction at $-20°$ C.–200° C. for several minutes—several days in an organic solvent, if necessary, in the presence of an acidacceptor.

In this case, the reaction is suitably carried out in the presence of halides of metals belonging to Group 1 and Group 2 of the Mendelejeff's periodic table or hydrogen halides. These halides of metals and hydrogen halides act as solubilization aids for aromatic polyamides produced.

The organic solvents mentioned above include, for example, amide solvents such as N,N-dimethylacetamide and N-methyl-2-pyrrolidone, aromatic solvents such as benzene, anisole, diphenyl ether, nitrobenzene, and benzonitrile, and halogen solvents such as chloroform, dichloromethane, 1,2-dichloroethane, and 1,1,2,2-tetrachloroethane. Amide solvents are especially preferred. Preferred examples of such amide solvents are tetramethylurea, hexamethylphosphoramide, N,N-dimethylacetamide, N,N'-dimethylformamide, N-methylpyrrolidone-2, N-methylpiperidone-2, N,N-dimethylethyleneurea, N,N,N',N'-tetramethylmalonic acid amide, N-methylcaprolactam, N-acetylpyrrolidine, N,N-diethylacetamide, N-ethylpyrrolidone-2, N,N-dimethylpropionic acid amide, N,N-dimethylisobutylamide, N-methylformamide, N,N'-dimethylpropyleneurea and mixtures thereof. Among them, especially advantageous are N-methylpyrrolidone-2, hexamethylphosphoramide, N,N-dimethylacetamide, N,N'-dimethylformamide and mixtures thereof.

A suitable polycondensation method is as follows. At least two diamines of the formulas (I), (II), (IV), and (V) or hydrohalides thereof are dissolved in the above amide solvents and then to this solution is added the above dicarboxylic acid halides, especially dicarboxylic acid dichloride under stirring. After addition of the compounds, depending on the kind of the compounds used, in some case, viscosity rapidly increases and in some case, it increases slowly and the polymerization reaction substantially terminates after 24 hours at longest. In this case, the amide solvents acts also as an acid-acceptor for hydrohalides such as hydrochloride released by the above reaction.

The reaction temperature is preferably $-20°$ C.–100° C., more preferably $-5°$ C.–70° C.

In such solution polycondensation, concentrations of monomers affect viscosity of polymer solution obtained and polymerization degree of polymer obtained. Concentrations of monomers for increasing polymerization degree and/or obtaining proper viscosity of polymer solution obtained also change depending on kind and amount of monomers selected and reaction temperature and can be determined by a series of experiments and are preferably 2–30% by weight, more preferably 4–20% by weight.

In polymerization, it is preferred to add the above-mentioned solubilizing aid for aromatic polyamide produced to polymerization reaction mixture before, during and/or after polymerization.

Such solubilizing aid has been referred to above and lithium chloride, calcium chloride and hydrogen chloride are especially preferred.

Furthermore, if alkaline metal compounds such as lithium hydroxide, lithium carbonate, calcium hydroxide, calcium oxide, calcium carbonate, lithium hydride, and calcium hydride are added to the polymerization reaction mixture before, during and/or after polymerization, these metal compounds act as an acid-acceptor or a neutralizing agent for polymerization reaction mixture and besides, salts of the metals produced from the neutralization reaction also act as solubilizing aid for aromatic polyamide produced.

Solution of aromatic polyamide obtained by the above solution polymerization (polymer solution) can be used, as it is, as solution for molding, for example, a spinning solution(dope). Such polymer solution may contain the metal salts mentioned above, but a polymer solution containing no such metal salts is preferred. If necessary, a chain terminating agent can further be added to the polymer solution and suitable chain terminating agent is a compound having only one group which reacts with amino group and haloformyl group.

Furthermore, in the present invention, it is also possible that the solution obtained by the above polymerization reaction is mixed with water or the like, the resulting precipitate is collected by filtration, washed and dried and the resulting polymer is again dissolved in a solvent to obtain a spinning dope.

When component (a) or component (c) is used as dicarboxylic acid in the present process, the reaction is preferably carried out in an organic solvent in the presence of aromatic phosphite ester and pyridine.

As aromatic phosphite esters used in the present invention, mention may be made of triphenyl phosphite, diphenyl phosphite, tri-o-tolyl phosphite, di-o-tolyl phosphite, tri-m-tolyl phosphite, di-m-tolyl phosphite, tri-p-tolyl phosphite, di-p-tolyl phosphite, tri-o-chlorophenyl phosphite, di-o-chlorophenyl phosphite, tri-p-chlorophenyl phosphite, and di-p-chlorophenyl phosphite.

As pyridine derivatives used in the present invention, mention may be made of pyridine, 2-picoline, 3-picoline, 4-picoline, 2,4-lutidine, 2,6-lutidine and 3,5-lutidine.

In order to obtain polyamide resins of high polymerization degree, it is also possible to add inorganic salts such as lithium chloride and calcium chloride and organic salts such as triethylamine hydrochloride, tetrabutylammonium chloride, and cethyltrimethylammonium chloride to the reaction system.

It is possible to use dicarboxylic acids and diamines other than those specified in the present invention as far as the features of the aromatic polyamides of the present invention that they are solvent-soluble with keeping characteristics of aromatic polyamides are not lost. Examples of the other dicarboxylic acids and diamines are aliphatic diamines and naphthalenedicarboxylic acids excluding those specified in the present invention.

The present invention will be explained in more detail by the following examples.

Measurement of the properties was conducted by the following methods.

Inherent viscosity $\eta$ inh:

0.1 g of polymer was dissolved in 20 ml of sulfuric acid and 10 ml of the solution was taken in Ostwald's viscometer. The viscometer was put in a thermostatic bath of 30° C. and time (t) required for falling was measured. Then, similarly measurement of the falling time ($t_o$) was conducted on only the solvent. Inherent viscosity $\eta$ inh was obtained from these values using the following formula:

$$\eta\ inh = ln(t/t_o)/0.5$$

(Note): As a measure for $t_o$, a viscometer of about 120 seconds was used.

Glass transition temperature (Tg), melting point (Tm):

A differential scanning calorimeter (DSC-20) manufactured by Seiko Denshi Kogyo Co. was used for measurement. About 10 mg of the resulting polymer was accurately weighed and put in an aluminum pan and heated from 50° C. to 400° C. at 10° C./min. Peak of the first inflection point was taken as Tg and endothermic peak point was taken as Tm.

Heat decomposition temperature:

Thermogravimetric analyzer (Tg/DTA-20) manufactured by Seiko Denshi Kogyo Co. was used for measurement. About 10 mg of polymer was accurately weighed and put in a platinum pan and heated at 10° C./min and 10% weight reduction point was taken as heat decomposition temperature.

Solubility:

Solvent to be measured was taken in a test tube and 1-3% of polymer was added thereto. This was left to stand for 24 hours at room temperature and solubility was visually evaluated. After leaving for 24 hours, when a polymer was dissolved with heat and did not precipitate after cooling, this polymer was regarded to have been dissolved.

Tensile strength, elongation and tensile modulus of elasticity:

Measurement was conducted in accordance with ASTM D-822-83 using RTM-25rtm manufactured by Toyo Baldwin Co. Film was cut to 120 mm in length and 100 mm width and the portions of 10 mm from both ends thereof, were covered with paper and allowed to adhere to the paper so that the test piece did not slip off from grip. Thicknesses of this test piece were measured at five points by a thickness meter and average value thereof was regarded to be thickness of the test piece. The test piece was nipped by grip and distance between the grips was adjusted to 100 mm. Load-elongation curve was recorded under a maximum load of 10 kg and at a pulling rate of 50 m/min and tensile strength and elongation were calculated by the following formula.

*Tensile strength* $(kgf/mm^2) = A\ kgf/sectional\ area\ mm^2$

A: load

*Elongation* $(\%) = (L\ mm - 100\ mm)/100\ mm \times 100$

L: Elongation (mm) of test piece at breaking

The film was cut to 270 mm in length and 10 mm in width and the portions of 10 mm from both ends were covered with paper and allowed to adhere to the paper to obtain a test piece. Thicknesses were measured at five points by a thickness meter and average value thereof was taken as thickness of the test piece. The test piece was nipped by grips and distance between the grips was adjusted to 250 mm. Load-elongation curve was recorded under a maximum load of 10 kg and at a pulling rate of 25 mm/min and tensile modulus of elasticity was calculated by the following formula.

Tensile modulus of elasticity (kgf/mm) = B kgf 100 mm/sectional area mm²

B: Load necessary to elongate unit length

EXAMPLES 1-7

Each diamine (10 mmol) shown in Table 1 was dissolved in N-methyl-2-pyrrolidone and the solution was completely frozen over dry ice-acetone bath. To the resulting solid was added naphthalene-2,7-dicarboxylic acid dichloride (2.530 g, 10 mmol), followed by stirring in nitrogen atmosphere at 0° C. for 3 hours. After completion of the reaction, the polymer solution was introduced into methanol to obtain a polymer.

The resulting polymer (3 g) was completely dissolved in N-methyl-2-pyrrolidone (20 ml) and this solution was cast by a glass rod on a glass plate the surface of which had been washed. This glass plate was horizontally placed in a vacuum dryer and dried for 12 hours at room temperature, further for 12 hours at 80° C., for 12 hours at 150° C. and for 12 hours at 200° C. to make a film.

Inherent viscosity η inh, glass transition temperature Tg, melting point Tm, heat decomposition temperature Td, and solubility of polymer are shown in Table 2 and tensile strength, elongation and tensile modulus of elasticity are shown in Table 3.

TABLE 1

| | Starting materials and amount thereof | N-methyl-2-pyrrolidone |
|---|---|---|
| Example 1 | 4,4'-oxydianiline 2.000 g (10 mmol) naphthalene-2,7-dicarboxylic acid dichloride 2.530 g (10 mmol) | 22 ml |
| Example 2 | 3,4'-oxydianiline 2.000 g (10 mmol) naphthalene-2,7-dicarboxylic acid dichloride 2.530 g (10 mmol) | 20 ml |
| Example 3 | 4,4'-methylenedianiline 1.980 g (10 mmol) naphthalene-2,7-dicarboxylic acid dichloride 2.530 g (10 mmol) | 40 ml |
| Example 4 | 3,3'-carbonyldianiline 2.124 g (10 mmol) naphthalene-2,7-dicarboxylic acid dichloride 2.530 g (10 mmol) | 20 ml |
| Example 5 | 4,4'-sulfonyldianiline 2.484 g (10 mmol) naphthalene-2,7-dicarboxylic acid dichloride 2.530 g (10 mmol) | 20 ml |
| Example 6 | bis-[4-(4-aminophenoxy)phenyl]sulfone 4.325 g (10 mmol) naphthalene-2,7-dicarboxylic acid dichloride 2.530 g (10 mmol) | 20 ml |
| Example 7 | 1,4-bis(4-aminocumyl)benzene 3.444 g (10 mmol) naphthalene-2,7-dicarboxylic acid dichloride 2.530 g (10 mmol) | 20 ml |

TABLE 2

| | Viscosity (dl/g) ηinh | Glass transition temperature (°C.) | Melting point (°C.) | Heat decomposition temperature (°C.) | Solubility Dissolvable solvents |
|---|---|---|---|---|---|
| Example 1 | 0.97 | — | 475 | 480 | E, H |
| Example 2 | 1.24 | 248 | — | 460 | A, B, C, E, F, G, H |
| Example 3 | 0.82 | — | 465 | 475 | B, C, E, F, G, H |
| Example 4 | 0.78 | 252 | — | 455 | A, B, C, E, G, H |
| Example 5 | 0.65 | 297 | — | 445 | A, B, C, E, G, H |
| Example 6 | 0.80 | 259 | — | 475 | A, B, C, D, E, F, G, H |
| Example 7 | 1.05 | 211 | — | 450 | A, B, C, E, F, G, H |

A = pyridine
B = dimethylformamide
C = dimethylsulfoxide
D = sulfolane
E = dimethylimidazolidone
F = m-cresol
G = dimethylacetoamide
H = N-methyl-2-pyrrolidone

TABLE 3

| | Tensile strength (kgf/mm²) | Elongation (%) | Tensile modulus of elasticity (kgf/mm²) |
|---|---|---|---|
| Example 1 | 12 | 35 | 320 |
| Example 4 | 12 | 42 | 290 |
| Example 6 | 9 | 14 | 280 |
| Example 7 | 8 | 6 | 280 |
| Example 2 | 12 | 16 | 310 |

EXAMPLE 8

Naphthalene-2,7-dicarboxylic acid (2.164 g, 10 mmol), 4,4'-oxydianiline (2.000 g, 10 mmol), triphenyl phosphite (6.20 g, 20 mmol), pyridine (5 ml), calcium chloride (2.00 g), and N-methyl-2-pyrrolidone (20 ml) were stirred in nitrogen atmosphere at 100° C. for 3 hours. After completion of reaction, polymer solution was introduced into methanol to obtain a polymer.

Inherent viscosity η inh of the polymer was 2.32.

EXAMPLES 9-10 AND COMPARATIVE EXAMPLES 1-2

Each of the diamines shown in Table 4 was dissolved in N-methyl-2-pyrrolidone and the solution was completely frozen over dry ice-acetone bath. To the resulting solid was added the following dicarboxylic acid, followed by stirring in nitrogen atmosphere at 0° C. for 3 hours. After completion of reaction, the polymer solution was introduced into methanol to obtain a polymer.

The resulting polymer (3 g) was completely dissolved in N-methyl-2-pyrrolidone (20 ml) and this solution was cast by a glass rod on a glass plate the surface of which had been washed. This glass plate was horizontally placed in a vacuum dryer and dried for 12 hours at room temperature, furthermore for 12 hours at 80° C., for 12 hours at 150° C. and for 12 hours at 200° C. to make a film.

Inherent viscosity η inh, glass transition temperature Tg, melting point Tm, heat decomposition temperature Td, and solubility are shown in Table 5 and tensile strength, elongation and tensile modulus of elasticity are shown in Table 6.

TABLE 4

| | Starting materials and amount thereof | N-methyl-2-pyrrolidone |
|---|---|---|
| Example 9 | m-phenylenediamine (100 mol %) 1.082 g (10 mmol) 2,6-naphthalenedicarboxylic acid dichloride 50 mol %) 1.265 g (5 mmol) 2,7-naphthalenedicarboxylic acid dichloride (50 mol %) 1.265 g (5 mmol) | 80 ml |
| Example 10 | m-phenylenediamine (100 mol %) 1.082 g (5 mmol) terephthalic aicd dichloride (50 mol %) 1.016 g (5 mmol) 2,7-naphthalenedicarboxylic acid dichloride (50 mol %) 1.265 g (10 mmol) | 50 ml |
| Comparative example 1 | m-phenylenediamine (100 mol %) 1.082 g iso-phthalic acid dichloride (50 mol %) 1.016 g terephthalic acid dichloride (50 mol %) 1.016 g | 20 ml |
| Comparative example 2 | m-phenylene diamine (100 mol %) 1.082 g (10 mmol) 2,6-naphthalenedicarboxylic acid dichloride (100 mol %) 2.530 g (10 mmol) | 80 ml and CaCl$_2$ 1% |

TABLE 5

| | Composition of acid chloride*1 (mol %) | | | | Viscosity $\eta$inh (dl/g) | Glass transition temperature Tg (°C.) | Melting point Tm (°C.) | Heat decomposition temperature (°C.) | Solubility*2 |
|---|---|---|---|---|---|---|---|---|---|
| | 2,7NDC | 2,6NCD | IPC | TPC | | | | | |
| Example 9 | 50 | 50 | | | 0.74 | 282 | — | 485 | B, C, E, G, H |
| Example 10 | 50 | | | 50 | 0.50 | 307 | — | 497 | B, C, E, G, H |
| Comparative Example 1 | | | 50 | 50 | 1.10 | 279 | — | 449 | B, C, E, G, H |
| Comparative Example 2 | | 100 | | | 0.73 | — | 487 | 470 | Insoluble |

*1 2,7NDC = 2,7-naphthalenedicarboxylic acid dichloride
2,6NDC = 2,6-naphthalenedicarboxylic acid dichloride
IPC = iso-phthalic acid dichloride
TPC = terephtalic acid dichloride
*2 B = dimethylformamide
C = dimethylsulfoxide
E = diemthylimidazolidone
F = meta-cresol
G = dimethylacetoamide
H = N-methyl-2-pyrrolidone

TABLE 6

| | Tensile strength (kgf/mm$^2$) | Elongation (%) | Tensile modulus of elasticity (kgf/mm$^2$) |
|---|---|---|---|
| Example 9 | 15 | 10 | 490 |
| Example 10 | 12 | 10 | 430 |
| Comparative example 1 | 11 | 12 | 420 |

EXAMPLE 11

Naphthalene-2,7-dicarboxylic acid (50 mol %) (1.082 g, 5 mmol), naphthalene-2,6-dicarboxylic acid (50 mol %) (1.082 g, 5 mmol), m-phenylenediamine (100 mol %) (1.082 g, 10 mmol), triphenyl phosphite (6.20 g, 20 mmol), pyridine (5 ml), calcium chloride (2.00 g), and N-methyl-2-pyrrolidone (20 ml) were stirred in nitrogen atmosphere at 100° C. for 3 hours. After completion of the reaction, the polymer solution was introduced into methanol to obtain a polymer.

Inherent viscosity $\eta$ inh of the polymer was 1.02.

What is claimed is:

1. An aromatic polyamide which comprises a dicarboxylic acid recurring unit represented by the formula (I):

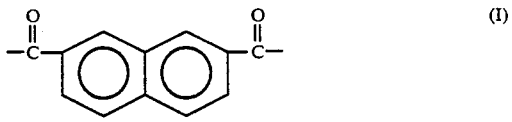

(I)

and a diamine recurring unit represented by the formula (II):

—NH—Ar$_1$—NH—  (II)

wherein Ar$_1$ represents a phenylene group, a naphthylene group or a group represented by the formula (III):

(III)

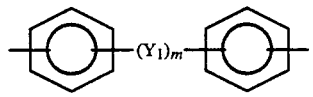

wherein Y$_1$ represents a lower alkylidene group, an oxygen atom, a sulfur atom, a carbonyl group, or a sulfonyl group and m is 0 or 1.

2. An aromatic polyamide according to claim 1, wherein Ar$_1$ in the formula (II) is a group represented by the formula (III) and Y$_1$ is a methylene group, an oxygen atom, a carbonyl group, or a sulfonyl group.

3. An aromatic polyamide according to claim 4, wherein Ar$_1$ and Ar$_2$ are phenylene groups and Ar$_3$ is 2,6-naphthylene group.

4. An aromatic copolyamide which comprises 10–90 mol % of a recurring unit represented by the formula (IV):

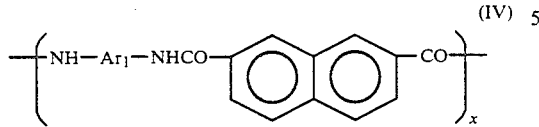

and 10-90 mol % of a recurring unit represented by the formula (V):

—NH—Ar$_2$—NHCO—Ar$_3$—CO—  (V)

wherein Ar$_1$ and Ar$_2$ each represents a phenylene group, a naphthylene group or a group represented by the formula (III):

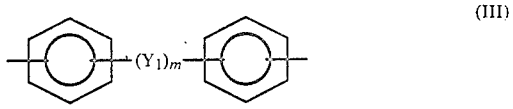

and Ar$_1$ and Ar$_2$ are identical or different and Ar$_3$ is a group selected from 1,4-phenylene, 2,6-naphthylene and 1,5-naphthylene, Y$_1$ represents a lower alkylidene group, an oxygen atom, a sulfur atom, a carbonyl group, or a sulfonyl group, m represents 0 or 1 and x and y each is 10 to 200.

5. A process for producing the aromatic polyamide of claim 1 which comprises reacting (a) a naphthalene-2,7-dicarboxylic acid or a dihalide thereof with (b) an aromatic diamine represented by the formula: H$_2$N—Ar$_1$—NH$_2$ wherein Ar$_1$ is as defined above.

6. A process for producing the aromatic polyamide of claim 4 which comprises reacting totally 10-90 mol % of a diamine represented by H$_2$N—Ar$_1$—NH$_2$ or H$_2$N—Ar$_2$—NH$_2$ wherein Ar$_1$ and Ar$_2$ are as defined above and an aromatic dicarboxylic acid represented by the formula XOC—Ar$_3$—COX wherein Ar$_3$ is as defined above, with 90-10 mol % of 2,7-naphthalenedicarboxylic acid or a dihalide thereof.

* * * * *